US012731814B2

(12) United States Patent
Bickmore et al.

(10) Patent No.: US 12,731,814 B2
(45) Date of Patent: Sep. 8, 2026

(54) SOLID STATE ELECTROLYTE AND METHOD OF PRODUCTION

(71) Applicant: Solid Power Operating, Inc., Louisville, CO (US)

(72) Inventors: Clint R. Bickmore, Louisville, CO (US); Brian E. Francisco, Arvada, CO (US); Samuel Oberwetter, Lafayette, CO (US); Joshua Buettner-Garrett, Arvada, CO (US); Benjamin A. Carlson, Minneapolis, MN (US)

(73) Assignee: Solid Power Operating, Inc., Louisville, CO (US)

( * ) Notice: Subject to any disclaimer, the term of this patent is extended or adjusted under 35 U.S.C. 154(b) by 735 days.

(21) Appl. No.: 18/084,371

(22) Filed: Dec. 19, 2022

(65) Prior Publication Data

US 2023/0198011 A1 Jun. 22, 2023

Related U.S. Application Data

(60) Provisional application No. 63/265,670, filed on Dec. 17, 2021.

(51) Int. Cl.
*H01M 10/0562* (2010.01)

(52) U.S. Cl.
CPC .................. *H01M 10/0562* (2013.01); *H01M 2300/0068* (2013.01)

(58) Field of Classification Search
None
See application file for complete search history.

(56) References Cited

U.S. PATENT DOCUMENTS 3,049,406 A * 8/1962 Grant .................... C01D 15/04 423/499.3
8,518,585 B2 8/2013 Ota et al.
(Continued)

FOREIGN PATENT DOCUMENTS

JP 5580979 B2 8/2014
JP 2014216117 A 11/2014
(Continued)

OTHER PUBLICATIONS

International Searching Authority, International Search Report and Written Opinion, issued in connection with International Application No. PCT/US2022/053407, mailed Apr. 6, 2023 (14 pages).
(Continued)

*Primary Examiner* — Kevin M Bernatz
(74) *Attorney, Agent, or Firm* — Polsinelli PC; Blake Andrew Ronnebaum

(57) ABSTRACT

A process for preparing a solid electrolyte that includes mixing a lithium source with a sulfur source and a compound containing phosphorous and sulfur to form a composite, then heating the composite to the melting point of the compound containing phosphorous and sulfur to form the solid electrolyte material. A solid electrolyte material prepared by the process, wherein the solid electrolyte material is of formula I, which is $Li_{(7-y-z)}PS_{(6-y-z)}X_{(y)}W_{(z)}$ wherein X and W are individually selected from F, Cl, Br, and I; where y and z each individually range from 0 to 2; and where y+z ranges from 0 to 2.

17 Claims, 3 Drawing Sheets

(56) References Cited

U.S. PATENT DOCUMENTS

| | | | | |
|---|---|---|---|---|
| 9,196,925 | B2 | 11/2015 | Aburatani et al. | |
| 9,595,735 | B2 | 3/2017 | Sugiura et al. | |
| 9,793,574 | B2 | 10/2017 | Seino et al. | |
| 10,020,535 | B2 | 7/2018 | Sato et al. | |
| 10,038,215 | B2 | 7/2018 | Sugiura et al. | |
| 10,116,002 | B2 | 10/2018 | Sato et al. | |
| 10,186,730 | B2 | 1/2019 | Omoda et al. | |
| 10,290,896 | B2 | 5/2019 | Sung et al. | |
| 10,868,330 | B2 | 12/2020 | Sung et al. | |
| 10,938,062 | B2 | 3/2021 | Sugiura et al. | |
| 11,183,708 | B2 | 11/2021 | Aburatani et al. | |
| 11,271,245 | B2 | 3/2022 | Katori et al. | |
| 11,575,149 | B2 | 2/2023 | Lim et al. | |
| 2014/0315098 | A1 | 10/2014 | Inoue | |
| 2015/0093652 | A1 | 4/2015 | Aihara et al. | |
| 2021/0265655 | A1 | 8/2021 | Minami | |
| 2023/0038374 | A1* | 2/2023 | Nakayama | C01B 25/14 |
| 2023/0231183 | A1* | 7/2023 | Ito | H01M 10/0525 429/323 |
| 2024/0217831 | A1* | 7/2024 | Francisco | C01D 15/00 |
| 2025/0066211 | A1* | 2/2025 | Francisco | H01M 10/052 |
| 2025/0219133 | A1* | 7/2025 | Culver | C01B 25/14 |

FOREIGN PATENT DOCUMENTS

| | | | |
|---|---|---|---|
| JP | 5823811 | B2 | 11/2015 |
| JP | 2016213006 | A | 12/2016 |
| JP | 2017188352 | A | 10/2017 |
| JP | 6236220 | B2 | 11/2017 |
| JP | 6819559 | B2 | 1/2021 |
| WO | 2021177598 | A1 | 9/2021 |
| WO | 2021251347 | A1 | 12/2021 |

OTHER PUBLICATIONS

Yu, C. et al., Supersonic conductivity in lithium argyrodite solid-state electrolyte by controlled CI-doping, Nano Energy, 69:104396, 2020 (11 pages).

* cited by examiner

SOLID STATE ELECTROLYTE AND METHOD OF PRODUCTION

CROSS-REFERENCE TO RELATED APPLICATION

This application is related to and claims priority under 35 U.S.C. § 119 from U.S. Provisional Application No. 63/265,670, filed Dec. 17, 2021, entitled "Solid-State Electrolyte and Method of Production," the entire contents of which are fully incorporated by reference herein for all purposes.

TECHNICAL FIELD

The present disclosure relates to methods for producing electrolyte materials, and therefore encompasses the fields of chemistry, chemical engineering, and electrical engineering.

BACKGROUND

Advancing battery technologies is paramount to meet the ever-increasing adoption of mobile devices, electric automobiles, and the development of Internet-of-Things devices; therefore, the need for battery technologies with improved reliability, capacity (Ah), thermal characteristics, lifetime, and recharge performance has never been greater. Solid-state battery cells utilize nonflammable, solid electrolyte in contrast to the flammable, liquid electrolyte used in traditional batteries. Thus, solid-state battery cells are safer for use in comparison to traditional batteries. However, there are issues with currently available solid-state battery cells, such as shorting of the cell, increased cell resistance, and low specific cell capacity. In addition, solid-state battery cells can be costly to produce because the raw materials are expensive, and the manufacturing process takes a great deal of time while requiring a significant amount of energy to complete. In particular, a lithium source common to sulfide solid electrolyte manufacturing is $Li_2S$. Traditional manufacturing of $Li_2S$ is costly due to the requirements of handling $H_2S$ gas and remaining air-free during synthesis, packaging, and transport. To overcome these problems, a novel process for synthesizing a solid electrolyte for use in solid-state battery cells that does not use $Li_2S$ has been developed, which is described herein.

SUMMARY

This application is directed to a process for preparing a solid electrolyte and its precursor components. The process comprises mixing one or more lithium sources with a sulfur source and may include a compound containing phosphorous and sulfur to form a homogeneous composite then heating the homogeneous composite to the melting point of the compound containing phosphorous and sulfur to form the solid electrolyte.

In one embodiment, the process further comprises simultaneously mixing the composite while heating.

In another embodiment, the one or more lithium sources comprise $Li_2CO_3$, a lithium halide, a lithium pseudohalide, $Li_2O$, $Li_3PO_4$, $LiBO_2$, $Li_2B_4O_7$, $Li_2ZrO_3$, $LiAlO_2$, $Li_2TiO_3$, $LiNbO_3$, $Li_2SiO_3$, or a mixture thereof.

In another embodiment, the lithium source comprises $Li_2CO_3$. In another embodiment, the lithium source comprises two lithium sources including $Li_2CO_3$ and LiCl.

In another embodiment, the lithium halide is selected from the group consisting of LiF, LiCl, LiBr, LiI, and mixtures thereof.

In another embodiment, the lithium pseudohalide is selected from the group consisting of $LiNO_3$, LiOH, $Li_2SO_3$, $Li_3N$, $Li_2NH$, $LiNH_2$, $LiBF_4$, $LiBH_4$, and mixtures thereof.

In another embodiment, the compound containing phosphorus and sulfur comprises a formula $P_4S_X$, wherein x ranges from about 3 to about 10.

In another embodiment, the compound containing phosphorus and sulfur is $P_2S_5$.

In another embodiment, the sulfur source is elemental sulfur, sulfur vapor, a polysulfide, $H_2S$ gas, or a combination thereof.

In another embodiment, the sulfur source is elemental sulfur.

In another embodiment, the sulfur source is a polysulfide. Examples of polysulfides that may be used as the sulfur source include, but are not limited to, lithium polysulfide, sodium polysulfide, potassium polysulfide, and combinations thereof. In an embodiment, the sulfur source is lithium polysulfide, such as $Li_2S_x$, where x ranges from about 2 to about 10.

In another embodiment, the molar ratio of lithium to phosphorus to sulfur (Li:P:S) is such that the reaction produces the desired electrolyte.

In another embodiment, the molar ratio of phosphorus to sulfur (P:S) is such that the reaction produces the desired sulfur incorporation.

In another embodiment, the molar ratio of lithium to sulfur (Li:S) is such that the reaction produces the desired sulfur incorporation.

In another embodiment, the solid electrolyte is a crystalline glassy-ceramic. In one embodiment, the solid electrolyte is produced from virgin materials. In another embodiment, the solid electrolyte is produced from recycled materials.

In another embodiment, the solid electrolyte material is of formula I: $Li_{(7-y-z)}PS_{(6-y-z)}X_{(y)}W_{(z)}$ (I), wherein X and W may each be individually selected from F, Cl, Br, and I, y and z each individually range from 0 to 2, and wherein y+z is ranges from 0 and 2.

In another embodiment, the solid electrolyte material of Formula I is selected from $Li_3PS_4$, $Li_4P_2S_6$, $Li_4P_2S_9$, $Li_6PS_5Cl$, $Li_7P_3S_{11}$, $Li_{5.5}PS_{4.5}Cl_{1.5}$, $Li_{5.5}PS_{4.5}ClBr_{0.5}$, $Li_5PS_4Cl_2$, and $Li_5PS_4ClBr$.

In another embodiment, the solid electrolyte material is of formula II: $Li_{(7-y-z)}PS_{(6-y-z-u)}O_uX_{(y)}W_{(z)}$ (II), wherein X and W are each individually selected from F, Cl, Br, and I, y and z range from 0 to 2, u ranges from about 0 to about 6, and wherein y+z ranges from 0 to 2.

In another embodiment, the solid electrolyte material of Formula II is selected from $Li_3PS_{3.9}O_{0.1}$, $Li_3PS_{3.5}O_{0.5}$, $Li_6PS_{4.8}O_{0.3}Cl$, $Li_6PS_{4.7}O_{0.3}Br$, $Li_{5.5}PS_{4.1}O_{0.4}Cl_{1.5}$, and $Li_{5.5}PS_{3.5}OClBr_{0.5}$.

In one embodiment of the process, the composite is heated to form a molten reactive flux. A molten reactive flux is defined herein as a solid/liquid mixture, wherein one of the precursors is a liquid and the remaining precursors are solids. The liquid precursor in the molten reactive flux may facilitate mass transport of the solid precursors in the molten reactive flux. The liquid precursor may also or alternatively participate in a chemical reaction with one or more of the solid precursors in the molten reactive flux.

In another embodiment of the process, the homogeneous composite is heated to a temperature from about 150° C. to about 600° C. In another embodiment, the homogeneous composite is heated to a temperature from about 150° C. to about 450° C.

In another embodiment of the process, the homogeneous composite is heated to about 172° C.

In another embodiment of the process, the homogeneous composite is heated to about 288° C.

In an alternative embodiment, this application is directed to a process for preparing a solid electrolyte material. The process may comprise: a) mixing $P_2S_5$ with elemental sulfur and $Li_2CO_3$ to form a homogeneous composite; and b) heating the composite to about 288° C. to form the solid electrolyte material.

In one embodiment, a solid electrolyte material prepared by the process described herein is selected from $Li_3PS_4$, $Li_4P_2S_6$, and $Li_7P_3S_{11}$.

In another embodiment, the solid electrolyte material prepared by the process described herein is $Li_3PS_4$.

In another embodiment, the solid electrolyte material prepared by the process described herein is $Li_4P_2S_6$.

In another embodiment, the solid electrolyte material prepared by the process described herein is $Li_7P_3S_{11}$.

In an alternative embodiment, this application is directed to a solid electrolyte material prepared by mixing one or more lithium sources with a sulfur source and a compound containing phosphorous and sulfur to form a homogeneous composite then heating the composite to the melting point of the compound containing phosphorous and sulfur to form the solid electrolyte, wherein the solid electrolyte material comprises formula I:

$$Li_{(7-y-z)}PS_{(6-y-z)}X_{(y)}W_{(z)} \quad (I)$$

wherein:

X and W are each individually selected from F, Cl, Br, and I;

y and z each individually range from 0 to 2; and wherein y+z ranges from 0 to 2.

In another embodiment, the solid electrolyte material of Formula I is selected from $Li_3PS_4$, $Li_4P_2S_6$, $Li_4P_2S_9$, $Li_6PS_5Cl$, $Li_7P_3S_{11}$, $Li_{5.5}PS_{4.5}Cl_{1.5}$, $Li_{5.5}PS_{4.5}ClBr_{0.5}$, $Li_5PS_4Cl_2$, and $Li_5PS_4ClBr$.

In an alternative embodiment, this application is directed to a solid electrolyte material prepared by mixing one or more lithium sources with a sulfur source and a compound containing phosphorous and sulfur to form a homogeneous composite then heating the composite to the melting point of the compound containing phosphorous and sulfur to form the solid electrolyte, wherein the solid electrolyte material comprises formula II:

$$Li_{(7-y-z)}PS_{(6-y-z-u)}O_uX_{(y)}W_{(z)} \quad (II)$$

wherein:

X and W are each individually selected from F, Cl, Br, and I;

y and z each individually range from 0 to 2;

u ranges from about 0 to about 6; and wherein y+z ranges from 0 to 2.

In another embodiment, the solid electrolyte material of Formula II is selected from $Li_3PS_{3.9}O_{0.1}$, $Li_3PS_{3.5}O_{0.5}$, $Li_6PS_{4.8}O_{0.3}Cl$, $Li_6PS_{4.7}O_{0.3}Br$, $Li_{5.5}PS_{4.1}O_{0.4}Cl_{1.5}$, and $Li_{5.5}PS_{3.5}OClBr_{0.5}$.

Further provided herein is a process for preparing a lithium-containing material. The process comprises mixing one or more lithium sources with a sulfur source and may include a compound containing phosphorous and sulfur to form a composite then heating the composite to the melting point of the compound containing phosphorous and sulfur to form the solid electrolyte. The lithium-containing material may be a solid electrolyte material or a precursor for a solid electrolyte material.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION

Figure 1:
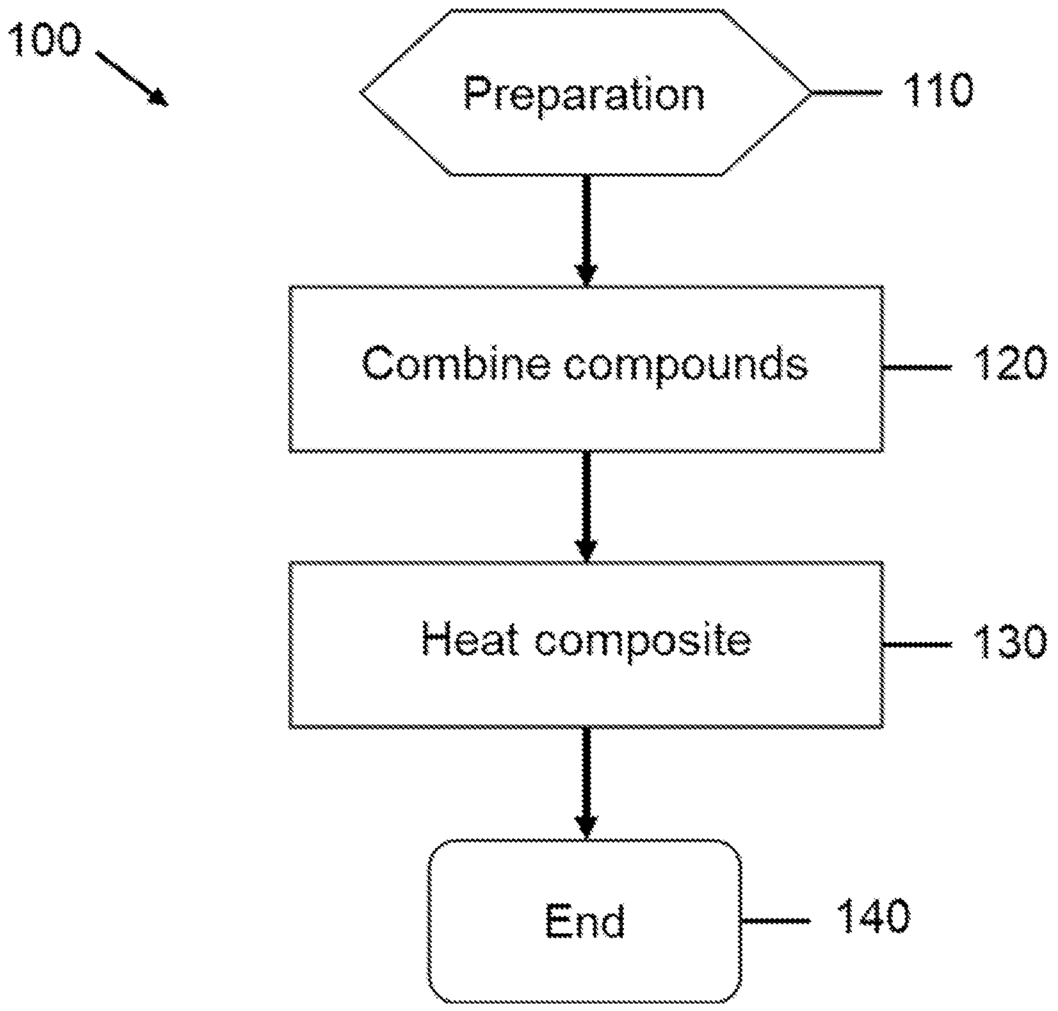
FIG. 1 is a flow chart of a process for producing a solid electrolyte material, in accordance with an embodiment.

In the following description, specific details are provided to impart a thorough understanding of the various embodiments of the disclosure. Upon having read and understood the specification, claims, and drawings hereof, however, those skilled in the art will understand that some embodiments of the disclosure may be practiced without hewing to some of the specific details set forth herein. Moreover, to avoid obscuring the disclosure, some well-known methods, processes, devices, and systems finding application in the various embodiments described herein are not disclosed in detail.

The present invention features a process for preparing a solid electrolyte material. The process may comprise: a) mixing one or more lithium sources with a sulfur source and a compound containing phosphorus and sulfur to form a composite; and b) heating the composite to the melting point of the compound containing phosphorus and sulfur to form the solid electrolyte material. The lithium source, sulfur source, and the compound containing phosphorus and sulfur may be individually or collectively referred to herein as "precursors" or "precursor materials". In one embodiment, the process may further comprise simultaneously mixing the composite while heating. Preferably, the processes described herein may be performed in less than 5 hours to prepare a solid electrolyte material.

In some embodiments, the mixing in step a) forms a homogeneous composite. As used herein, a "homogeneous composite" is understood to refer to a composite material wherein all or substantially all of the components of the composite material (i.e., the precursors) are approximately evenly distributed throughout the composite material. Mixing the precursor materials to form a homogeneous composite ensures an even distribution of all materials, which allows the materials to react in the appropriate ratios. Mixing during the heating step may also help to ensure uniform reaction. Additionally, mixing during the reaction may prevent a buildup of gases. For example, precursor materials such as $Li_2CO_3$ give off $CO_2$ and CO during the reaction. In other embodiments, the gases may include, $SO_2$, $H_2S$, and other gases. The mixing may help to break up any surface tension of the molted flux mixture to allow for all gasses to escape before they react with any of the precursor or product materials.

The mixing in step a) may be accomplished by methods generally known in the art. In some embodiments, agitators including agitated media mills, twin screw compounders, and other high shear equipment may be used to mix the materials to form a homogeneous composite.

The mixing in step a) may further comprise milling the homogeneous composite to a desired particle size. The milling may include wet milling or dry milling. The homogeneous composite may be milled for a predetermined period of time at a predetermined temperature to achieve a desired particle size. The milling may be accomplished using an attritor mill, an autogenous mill, a ball mill, a planetary ball mill, a buhrstone mill, a pebble mill, a rod mill, a semi-autogenous grinding mill, a tower mill, a vertical shaft impactor mill, or other milling apparatuses known in the art. Preferably, the milling is accomplished in a planetary ball mill or an attritor mill.

The average particle size (i.e., $D_{50}$) of the homogeneous composite may be from about 100 nm to about 1 mm after milling. For example, the average particle size of the homogeneous composite may be from about 100 nm to about 250 nm, about 100 nm to about 500 nm, about 100 nm to about 750 nm, about 100 nm to about 1 micron, about 100 nm to about 50 microns, about 100 nm to about 100 microns, about 100 nm to about 250 microns, about 100 nm to about 500 microns, about 100 nm to about 750 microns, about 100 nm to about 1 mm, about 250 nm to about 1 mm, about 500 nm to about 1 mm, about 750 nm to about 1 mm, about 1 micron to about 1 mm, about 50 microns to about 1 mm, about 100 microns to about 1 mm, about 250 microns to about 1 mm, about 500 microns to about 1 mm, about 750 microns to about 1 mm, about 250 nm to about 500 microns, about 500 nm to about 500 microns, about 500 nm to about 500 microns, or about 750 nm to about 250 microns.

Mixing time and milling time is not specifically limited as long as it allows for appropriate homogenization and reaction of the precursors to generate the solid electrolyte material. The mixing temperature is also not specifically limited as long as it allows for appropriate mixing and is not so high that a precursor enters the gaseous state or prematurely forms a molten reactive flux as described further herein. The mixing and milling may be accomplished in an inert atmosphere, a moisture-free atmosphere, or an ambient atmosphere.

The mixing and/or milling may be accomplished without the use of a solvent; i.e., the mixing and/or milling may be solvent-free. Alternatively, the mixing and/or milling may take place in the presence of a solvent. The solvent may include an alkane, a blend of alkanes, xylene (including para-, meta-, and ortho-xylene), toluene, benzene, heptane, octane, decalin, 1,2,3,4-tetrahydronaphthalene, or combinations thereof.

In another embodiment, the composite may be heated in step b) to a temperature from about 150° C. and about 600° C. The composite may be heated in step b) to a temperature from about 150° C. to about 200° C., about 150° C. to about 250° C., about 150° C. to about 300° C., about 150° C. to about 350° C., about 150° C. to about 400° C., about 150° C. to about 450° C., about 150° C. to about 500° C., about 150° C. to about 550° C., about 150° C. to about 600° C., about 200° C. to about 600° C., about 250° C. to about 600° C., about 300° C. to about 600° C., about 350° C. to about 600° C., about 400° C. to about 600° C., about 450° C. to about 600° C., about 500° C. to about 600° C., about 550° C. to about 600° C., about 150° C. to about 450° C., about 200° C. to about 400° C., about 200° C. to about 350° C., or about 250° C. to about 350° C. As an example, the composite may be heated in step b) to a temperature of about 150° C., about 175° C., about 200° C., about 225° C., about 250° C., about 275° C., about 300° C., about 325° C., about 350° C., about 375° C., about 400° C., about 425° C., or about 450° C. In exemplary embodiments, the composite may be heated in step b) to about 172° C., about 288° C., or about 408° C.

In another embodiment, the compound containing phosphorus and sulfur is heated in step b) to form a molten reactive flux. A molten reactive flux is defined herein as a solid/liquid mixture, wherein one of the precursors is a liquid and the remaining precursors are solids. The liquid precursor in the molten reactive flux may facilitate mass transport of the solid precursors in the molten reactive flux. The liquid precursor may also or alternatively participate in a chemical reaction with one or more of the solid precursors in the molten reactive flux. In the methods described herein, the liquid precursor in the molten reactive flux may comprise a compound containing phosphorus and sulfur. Without wishing to limit the present application to any theory or mechanism, by heating the compound containing phosphorus and sulfur to or just above its melting point, the compound containing phosphorus and sulfur behaves as an acid reducing flux. In an example, this "acid reducing flux" may aid in the removal of $CO_2$ from the $Li_2CO_3$, thus producing $Li_2O$. Continued heating in the presence of the sulfur source may convert the $Li_2O$ to $Li_2S$, which may then react with the compound containing phosphorus and sulfur to produce the solid electrolyte material.

Alternatively, the present invention features a process for preparing a solid electrolyte material. The process may comprise: a) mixing $P_2S_5$ with elemental sulfur and $Li_2CO_3$ to form a homogeneous composite; and b) heating the composite to about 150° C. to about 450° C. to form the solid electrolyte material. In one embodiment, the $P_2S_5$ is heated in step b) to a molten reactive flux.

Figure 2:
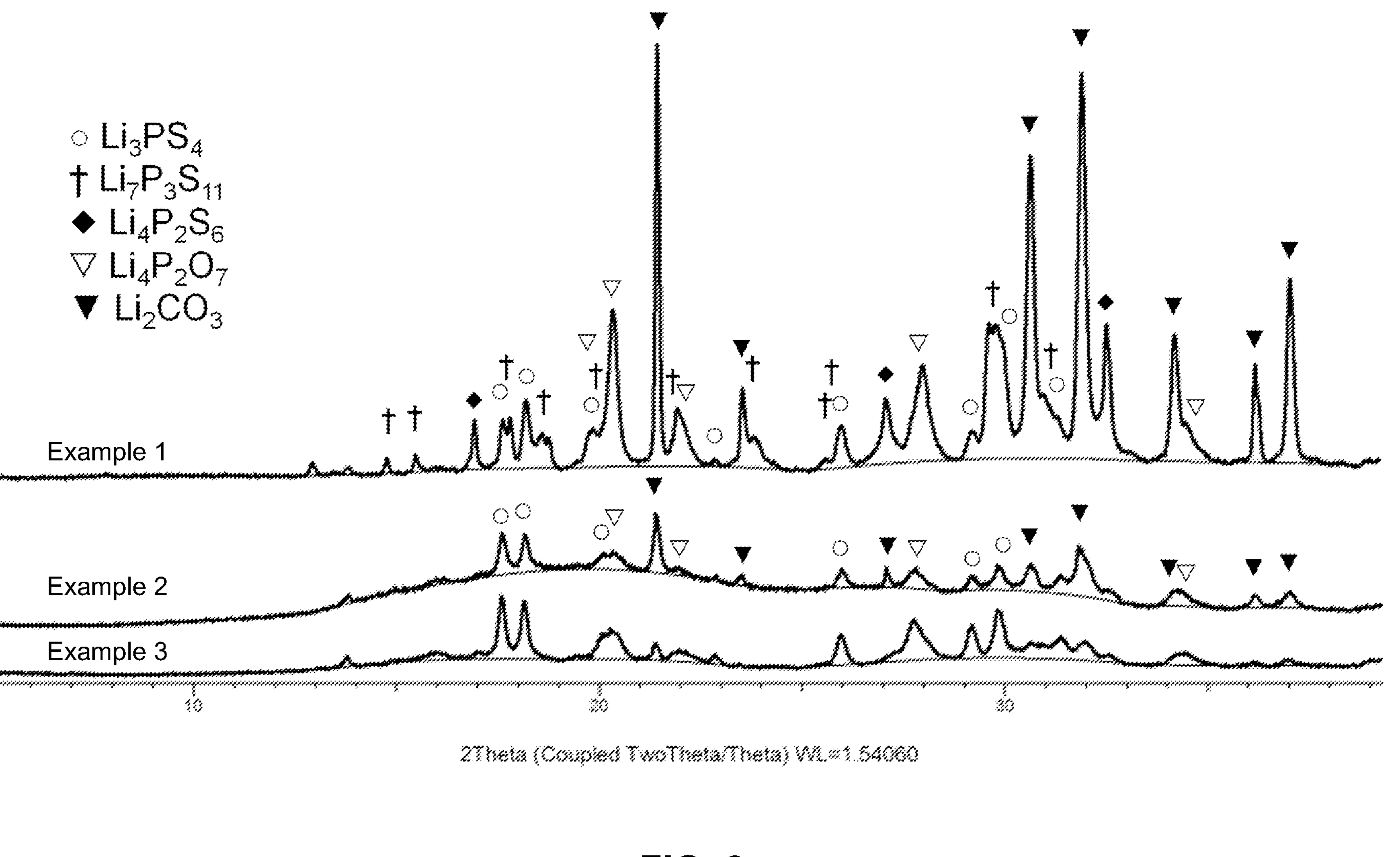
FIG. 2 is a plot of X-ray diffraction measurements of three different solid electrolyte materials produced by the process of the present application.

FIG. 1 is a flow chart of a process for producing a solid electrolyte material. Process 100 begins with preparation step 110 where any preparation action such as precursor synthesis, purification, and equipment preparation may take place. After any initial preparation, process 100 advances to step 120 where the compounds (the lithium source, the sulfur source, and the compound containing phosphorus and sulfur) are combined to form a homogeneous composite. The compounds may also be milled to a desired particle size at step 120. Next, in step 130 the composite may be heated to the melting point of the compound containing phosphorus and sulfur to form the solid electrolyte material. Optionally, the heating may further comprise simultaneously mixing the composite. In the final step 140, the solid electrolyte material may be used, for example, in the construction of electrochemical cells. FIG. 2 is a plot of X-ray diffraction measurements of exemplary solid electrolyte materials produced by the process indicated in FIG. 1.

The process of the present application will not work well if the temperature of heating in step b) is too far below the melting point of the compound containing phosphorus and sulfur. Additionally, if the composite is heated too rapidly to a point above the boiling point of the compound containing phosphorus and sulfur, then the material may evaporate before it has time to react with the lithium source.

Exemplary lithium sources may include one or more of $Li_2CO_3$, a lithium halide, a lithium pseudohalide, $Li_2O$, $Li_3PO_4$, $LiBO_2$, $Li_2B_4O_7$, $Li_2ZrO_3$, $LiAlO_2$, $Li_2TiO_3$, $LiNbO_3$, and $Li_2SiO_3$, or a mixture thereof. Exemplary lithium halides may include one or more of LiF, LiCl, LiBr, and LiI, while exemplary lithium pseudohalides may include $LiNO_3$, LiOH, $Li_2SO_3$, $Li_2SO_4$, $Li_3N$, $Li_2NH$, $LiNH_2$, $LiBF_4$, and $LiBH_4$.

Exemplary compounds containing phosphorus and sulfur may include, for example, $P_4S_X$ (where x ranges from 3 to 10) and $P_2S_5$. In an embodiment, phosphorus sulfide ($P_4S_x$) comprises mixtures of $P_4S_x$, where x ranges from 3 to 10, and may be a combination of $P_4S_3$, $P_4S_4$, $P_4S_5$, $P_4S_6$, $P_4S_7$, $P_4S_8$, $P_4S_9$, $P_4S_{10}$, and $P_4S_x$ where x is a non-integer. The compounds containing phosphorus and sulfur may have a low melting temperature. As used herein, a low melting temperature is defined as a melting temperature of less than 300° C., such as 250° C. or less, 200° C. or less, or 150° C. or less.

Exemplary sulfur sources may include, for example, elemental sulfur, sulfur vapor (i.e., elemental sulfur heated above its sublimation or boiling point), a polysulfide, $(NH_4)_2S$, or $H_2S$ gas. Non-limiting examples of polysulfides that may be used as the sulfur source include lithium polysulfide, sodium polysulfide, and potassium polysulfide. In an embodiment, the sulfur source is lithium polysulfide, such as $Li_2S_x$, where x is from 2 to 10. In embodiments where the sulfur source includes sulfur vapor, or $H_2S$ gas, the sulfur vapor, or $H_2S$ gas may be bubbled through or over the composite as heat is applied and the reaction is taking place. Alternatively, in embodiments where the sulfur source includes elemental sulfur, the elemental sulfur may be added directly to the composite mixture as a dry powder, a slurry, a solution, or a combination thereof.

The molar ratio of phosphorus to lithium to sulfur (P:Li:S) may be selected such that the reaction produces a desired solid electrolyte material. The molar amount of phosphorus in the molar ratio may be selected from about 1 to about 4, such as from about 1 to about 2, from about 1 to about 3, from about 2 to about 3, from about 2 to about 4, or from about 3 to about 4. In some examples, the molar amount of phosphorus in the molar ratio may be 1, 1.5, 2, 2.5, 3, 3.5, or 4. The molar amount of lithium in the molar ratio may be selected from 1 to 9, such as from about 1 to about 3, from about 1 to about 5, from about 1 to about 7, from about 3 to about 5, from about 3 to about 7, from about 3 to about 9, from about 5 to about 7, from about 5 to about 9, or from about 7 to about 9. In some examples, the molar amount of lithium in the molar ratio may be 1, 1.5, 2, 2.5, 3, 3.5, 4, 4.5, 5, 5.5, 6, 6.5, 7, 7.5, 8, 8.5, or 9. The molar amount of sulfur in the molar ratio may be selected from about 3 to about 12, such as from about 3 to about 6, from about 3 to about 9, from about 3 to about 12, from about 6 to about 9, from about 6 to about 12, or from about 9 to about 12. In some examples, the molar amount of sulfur in the molar ratio may be 3, 3.5, 4, 4.5, 5, 5.5, 6, 6.5, 7, 7.5, 8, 8.5, 9, 9.5, 10, 10.5, 11, 11.5, 12, 12.5, or 13. Thus, the molar ratio of phosphorus to lithium to sulfur may be 1-4:1-9:3-12.

As non-limiting examples, the molar ratio of phosphorus to lithium to sulfur used in the process may be according to the following reaction formulas. It should be understood that although the reactions are written with stoichiometric equivalence, any of the precursors may be added in molar excess. In particular, sulfur may be added in molar excess.

$$P_2S_5+3Li_2CO_3+3S \rightarrow 2Li_3PS_4+3CO_2+1.5O_2,$$

$$P_2S_5+3Li_2CO_3+6S \rightarrow 2Li_3PS_4+3CO+3SO_2,$$

$$P_2S_5+2Li_2CO_3+2S \rightarrow Li_4P_2S_6+2CO_2+SO_2,$$

$$P_2S_5+2Li_2CO_3+4S \rightarrow Li_4P_2S_6+2CO+3SO_2,$$

$$3P_2S_5+7Li_2CO_3+10.5S \rightarrow 2Li_7P_3S_{11}+7CO_2+3.5SO_2,$$

or $$P_2S_5+5Li_2CO_3+2LiCl+7.5S \rightarrow 2Li_6PS_5Cl+5CO_2+2.5SO_2.$$

$$P_2S_5+5Li_2CO_3+2LiCl+15S \rightarrow 2Li_6PS_5Cl+5CO+5SO_2.$$

The solid electrolyte prepared by the methods of the present disclosure may include $Li_7P_3S_{11}$. The solid electrolyte may have an X-ray diffraction pattern with peaks corresponding to 2theta of 14.8°±0.5°, 15.5°±0.5°, 17.9°±0.5°, 18.5°±0.5°, 20.0°±0.5°, 21.95°±0.5°, 23.9°±0.5°, 25.6°±0.5°, 25.7°±0.5°, 29.8°±0.5°, and 31.05°±0.5°.

The solid electrolyte prepared by the methods of the present disclosure may include $Li_3PS_4$. The solid electrolyte may have an X-ray diffraction pattern with peaks corresponding to 2theta of 17.5°±0.5°, 18.1°±0.5°, 19.9°±0.5°, 22.8°±0.5°, 25.95°±0.5°, 29.1°±0.5°, 29.9°±0.5°, 31.1°±0.5°.

The solid electrolyte prepared by the methods of the present disclosure may include $Li_4S_2S_6$. The solid electrolyte may have an X-ray diffraction pattern with peaks corresponding to 2theta of 17.0°±0.5°, 27.0°±0.5°, 32.2°±0.5°.

The solid electrolyte prepared by the methods of the present disclosure may include $Li_4P_2O_7$. The solid electrolyte may have an X-ray diffraction pattern with peaks corresponding to 2theta of 19.85°±0.5°, 20.2°±0.5°, 22°±0.5°, 27.95°±0.5°, 34.5°±0.5°.

The solid electrolyte prepared by the methods of the present disclosure may include $Li_2CO_3$. The solid electrolyte may have an X-ray diffraction pattern with peaks corresponding to 2theta of 21.2°±0.5°, 23.4°±0.5°, 30.6°±0.5°, 31.9°±0.5°, 34.0°±0.5°, 36.0°±0.5°, 37.0°±0.5°.

The process described herein may be used to prepare a solid electrolyte material of the formula $Li_{(7-y-z)}PS_{(6-y-z)}X_{(y)}W_{(z)}$ (where X and W are each individually selected from F, Cl, Br, and I, y and z range from 0 to 2, and wherein y+z ranges from 0 to 2. Exemplary solid electrolyte materials prepared by the process described herein may include, for example, $Li_3PS_4$, $Li_4P_2S_6$, $Li_6PS_5Cl$, $Li_{5.5}PS_{4.5}Cl_{1.5}$, $Li_{5.5}PS_{4.5}ClBr_{0.5}$, $Li_5PS_4Cl_2$, $Li_5PS_4ClBr$, and $Li_7P_3S_{11}$. The solid electrolyte material may be a crystalline glassy-ceramic.

The process described herein may further be used to prepare an oxysulfide solid electrolyte material of the formula $Li_{(7-y-z)}PS_{(6-y-z-u)}O_uX_{(y)}W_{(z)}$ where X and W are each individually selected from F, Cl, Br, and I, y and z range from 0 to 2, u ranges from about 0 to about 6, and wherein y+z ranges from 0 to 2. Exemplary oxysulfide solid electrolyte materials prepared by the process described herein may include, for example, $Li_3PS_{3.9}O_{0.1}$, $Li_3PS_{3.5}O_{0.5}$, $Li_6PS_{4.8}O_{0.3}Cl$, $Li_6PS_{4.7}O_{0.3}Br$, $Li_{5.5}PS_{4.1}O_{0.4}Cl_{1.5}$, and $Li_{5.5}PS_{3.5}OClBr_{0.5}$.

The processes described herein may further be used to prepare electrolyte precursors (e.g., $Li_2S$). The electrolyte precursors may be prepared as the desired product of the processes described herein, or as a byproduct. The electrolyte precursors may be formed from reactants such as elements (Li, S, P, etc.) and/or from other precursors described hereinabove (e.g., a lithium source, a compound containing phosphorus and sulfur, etc.).

EXAMPLES

Synthesis of the Solid-State Electrolyte

Example 1

4.527 g of $Li_2CO_3$ (Sigma-Aldrich Co.), 2.723 g $P_2S_5$ (Sigma-Aldrich Co.), and 2.750 g Sulfur (Sigma-Aldrich Co.) were added to a ceramic mortar where the material was ground for 10 minutes. 0.500 g of powder was loaded into a pellet die with 16 mm diameter, and the powder was compacted to 300 MPa for 2 minutes using a benchtop hydraulic press. The pellet was then heated to 400° C. for 15 minutes.

Example 2

Example 2 used the same materials as Example 1 except the precursors were added to a 250 ml zirconia milling jar with 400 g zirconia milling media and 60 ml xylenes (Sigma-Aldrich Co.). The mixture was milled in a Retsch PM 100 planetary mill for 2 hours at 350 RPM. The material was collected, and the solvent was removed at 70° C. under vacuum. 0.500 g of powder was loaded into a pellet die with 16 mm diameter, and the powder was compacted to 300 MPa for 2 minutes using a benchtop hydraulic press. The pellet was then heated to 400° C. for 15 minutes.

Example 3

Example 3 used the same materials as Example 2 except the precursor amounts were 5.971 g of $Li_2CO_3$, 3.326 g $P_2S_5$, and 3.357 g Sulfur.

Example 4

Example 4 used the same materials as Example 3 except the precursor amounts were 3.317 g of $Li_2CO_3$, 3.326 g $P_2S_5$, and 2.399 g Sulfur.

X-Ray Diffraction Measurements

X-ray diffraction measurements were carried out with a Bruker D8 Advance using a copper x-ray source and Lynx-eye detector. Samples were sealed in home-built sample holder with a beryllium window. Measurements were taken over 5-40 degrees 2-theta with a step size of 0.02 degrees.

From the XRD patterns shown in FIG. 2, it can be observed that Example 1 is a composite containing the electrolyte phases of $Li_3PS_4$, $Li_7P_3S_{11}$, $Li_4P_2O_7$, $Li_4P_2S_6$, and unreacted $Li_2CO_3$. The $Li_3PS_4$ has peaks at 2theta=17.5°, 18.1°, 19.9°, 22.8°, 25.95°, 29.1°, 29.9°, and 31.1°. The $Li_7P_3S_{11}$ has peaks at 2theta=14.8°, 15.5°, 17.9°, 18.5°, 20.0°, 21.95°, 23.9°, 25.6°, 25.7°, 29.8°, and 31.05°. The $Li_4P_2O_7$ has peaks at 19.85°, 20.2°, 22°, 27.95°, 34.5°. The $Li_2CO_3$ has peaks at 21.2°, 23.4°, 30.6°, 31.9°, 34.0°, 36.0°, and 37.0°.

From the XRD patterns shown in FIG. 2, it can further be observed that Example 2 is a composite containing the electrolyte phases of $Li_3PS_4$, $Li_4P_2O_7$, and unreacted $Li_2CO_3$. The $Li_3PS_4$ has peaks at 2theta=17.5°, 18.1°, 19.9°, 22.8°, 25.95°, 29.1°, 29.9°, and 31.1°. The $Li_4P_2O_7$ has peaks at 19.85°, 20.2°, 22°, 27.95°, 34.5°. The $Li_2CO_3$ has peaks at 21.2°, 23.4°, 30.6°, 31.9°, 34.0°, 36.0°, and 37.0°.

From the XRD patterns shown in FIG. 2, it can further be observed that Example 3 is a composite containing the electrolyte phases of $Li_3PS_4$, $Li_4P_2O_7$, and unreacted $Li_2CO_3$. The $Li_3PS_4$ has peaks at 2theta=17.5°, 18.1°, 19.9°, 22.8°, 25.95°, 29.1°, 29.9°, and 31.1°. The $Li_4P_2O_7$ has peaks at 19.85°, 20.2°, 22°, 27.95°, 34.5°. The $Li_2CO_3$ has peaks at 21.2°, 23.4°, 30.6°, 31.9°, 34.0°, 36.0°, and 37.0°.

Figure 3:
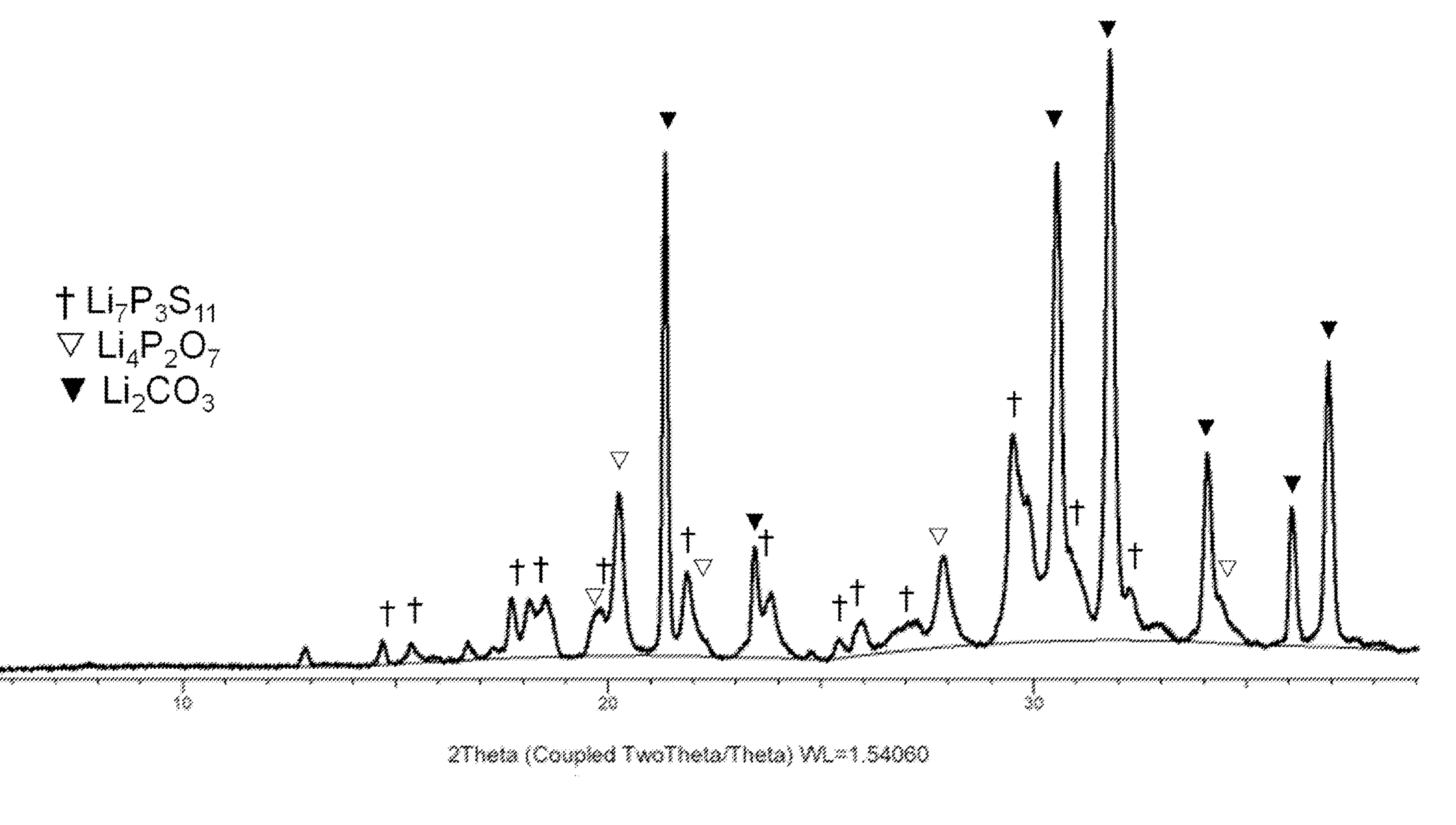
FIG. 3 is a plot of X-ray diffraction measurements of a solid electrolyte material produced by the process of the present application.

From the XRD pattern shown in FIG. 3, it can be observed that Example 4 is a composite containing the electrolyte phases of $Li_7P_3S_{11}$, $Li_4P_2O_7$, and unreacted $Li_2CO_3$. The $Li_7P_3S_{11}$ has peaks at 2theta=14.8°, 15.5°, 17.9°, 18.5°, 20.0°, 21.95°, 23.9°, 25.6°, 25.7°, 29.8°, and 31.05°. The $Li_4P_2O_7$ has peaks at 19.85°, 20.2°, 22°, 27.95°, 34.5°. The $Li_2CO_3$ has peaks at 21.2°, 23.4°, 30.6°, 31.9°, 34.0°, 36.0°, and 37.0°.

Ionic Conductivity

Ionic conductivity was measured as follows: approximately 0.250 g of powder was loaded into a pellet die with 16 mm diameter, and the powder was compacted to 300 MPa for 2 minutes using a benchtop hydraulic press. Compaction pressure was released and a measurement pressure of 8 MPa was applied. The cell was connected to a Biologic SP300 electrochemical workstation and complex impedance was measured over 7 MHz-1 Hz using 100 mV excitation. The resulting pattern was fit and used to calculate ionic conductivity.

The ionic conductivity, measured at room temperature, for the material prepared in Example 2 was $1.5\times10^{-7}$ S/cm.

The ionic conductivity, measured at room temperature, for the material prepared in Example 3 was $2.1\times10^{-5}$ S/cm.

Features described above as well as those claimed below may be combined in various ways without departing from the scope hereof. It should thus be noted that the matter contained in the above description or shown in the accompanying drawings should be interpreted as illustrative and not in a limiting sense.

What is claimed is:

1. A process for preparing a solid electrolyte comprising:

a) mixing one or more lithium sources with a sulfur source and a compound containing phosphorous and sulfur to form a homogeneous composite, wherein the compound containing phosphorus and sulfur is present in a molar excess as compared to the sulfur source and the one or more lithium sources; and b) heating the homogeneous composite to a melting point of the compound containing phosphorous and sulfur to form the solid electrolyte to form a molten reactive flux, wherein the compound containing phosphorous and sulfur is a liquid and the one or more lithium sources and the sulfur source are solid.

2. The process of claim 1, wherein the one or more lithium source comprises $Li_2CO_3$, a lithium halide, $LiNO_3$, LiOH, $Li_2SO_3$, $Li_3N$, $Li_2NH$, $LiNH_2$, $LiBF_4$, $LiBH_4$, $Li_2O$, $Li_3PO_4$, $LiBO_2$, $Li_2B_4O_7$, $Li_2ZrO_3$, $LiAlO_2$, $Li_2TiO_3$, $LiNbO_3$, $Li_2SiO_3$, or a mixture thereof.

3. The process of claim 2, wherein the lithium halide is selected from the group consisting of LiF, LiCl, LiBr, LiI, and mixtures thereof.

4. The process of claim 1 further comprising simultaneously mixing the homogeneous composite while heating.

5. The process of claim 1, wherein the compound containing phosphorous and sulfur comprises a formula $P_4S_X$, wherein x ranges from 3 to 10.

6. The process of claim 1, wherein the compound containing phosphorous and sulfur comprises $P_2S_5$.

7. The process of claim 1, wherein the homogeneous composite in step b) is heated to a temperature from about 150° C. and about 600° C.

8. The process of claim 1, wherein the homogeneous composite in step b) is heated to a temperature from about 150° C. to about 200° C.

9. The process of claim 1, wherein the homogeneous composite in step b) is heated to a temperature from about 250° C. to about 300° C.

10. The process of claim 1, wherein the sulfur source comprises elemental sulfur, sulfur vapor, a polysulfide, $H_2S$ gas, or a mixture thereof.

11. The process of claim 1, wherein the sulfur source comprises elemental sulfur.

12. The process of claim 1, wherein the solid electrolyte comprises formula I:

$$Li_{(7-y-z)}PS_{(6-y-z)}X_{(y)}W_{(z)} \quad (I)$$

wherein:

X and W are each individually selected from F, Cl, Br, and I;

y and z each individually range from 0 to 2; and wherein y+z ranges from 0 to 2.

13. The process of claim 12, wherein the solid electrolyte of Formula I is selected from $Li_3PS_4$, $Li_4P_2S_6$, $Li_7P_3S_{11}$, $Li_{5.5}PS_{4.5}Cl_{1.5}$, $Li_{5.5}PS_{4.5}ClBr_{0.5}$, $Li_5PS_4Cl_2$, and $Li_5PS_4ClBr$.

14. The process of claim 1, wherein the solid electrolyte comprises Formula II:

$$Li_{(7-y-z)}PS_{(6-y-z-u)}O_uX_{(y)}W_{(z)} \quad (II)$$

wherein:

X and W are each individually selected from F, Cl, Br, and I;

y and z each individually range from 0 to 2;

u ranges from about 0 to about 6; and wherein y+z ranges from 0 to 2.

15. The process of claim 14, wherein the solid electrolyte of Formula II is selected from $Li_3PS_{3.9}O_{0.1}$, $Li_3PS_{3.5}O_{0.5}$, $Li_6PS_{4.8}O_{0.3}Cl$, $Li_6PS_{4.7}O_{0.3}Br$, $Li_{5.5}PS_{4.1}O_{0.4}Cl_{1.5}$, and $Li_{5.5}PS_{3.5}OClBr_{0.5}$.

16. The process of claim 1, wherein the lithium source comprises $Li_2CO_3$.

17. The process of claim 1, wherein the lithium source comprises two lithium sources including $Li_2CO_3$ and LiCl.

* * * * *